(12) United States Patent
Marino

(10) Patent No.: US 10,753,819 B2
(45) Date of Patent: *Aug. 25, 2020

(54) SYSTEM AND METHOD FOR DETECTING LEAKS IN A FLUID FILLED VESSEL

(71) Applicant: Red Rhino Leak Detection, Inc., Palm Beach Gardens, FL (US)

(72) Inventor: Mark D. Marino, Palm Beach Gardens, FL (US)

(73) Assignee: Red Rhino Leak Detection, Inc., Palm Beach Gardens, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 16/736,165

(22) Filed: Jan. 7, 2020

(65) Prior Publication Data

US 2020/0141830 A1 May 7, 2020

Related U.S. Application Data

(63) Continuation of application No. 16/114,279, filed on Aug. 28, 2018, which is a continuation of application
(Continued)

(51) Int. Cl.
*G01M 3/22* (2006.01)
*G01M 3/32* (2006.01)
(Continued)

(52) U.S. Cl.
CPC .............. *G01M 3/226* (2013.01); *G01M 3/02* (2013.01); *G01M 3/32* (2013.01); *G01M 3/3254* (2013.01);
(Continued)

(58) Field of Classification Search
CPC ........... F16B 47/00; F16B 2/185; G01M 3/04; G01M 3/10; G01M 3/226; G01M 3/26;
(Continued)

(56) References Cited

U.S. PATENT DOCUMENTS

| 4,841,149 A * | 6/1989 | Martin | G01M 3/002 |
| | | | 250/330 |
| 5,065,690 A * | 11/1991 | Bontempo | G01M 3/20 |
| | | | 116/264 |

(Continued)

OTHER PUBLICATIONS

U.S. Appl. No. 16/114,279, filed Aug. 28, 2018.
(Continued)

*Primary Examiner* — Randy W Gibson
*Assistant Examiner* — Gedeon M Kidanu
(74) *Attorney, Agent, or Firm* — Kelly G. Swartz; Widerman Malek, PL

(57) ABSTRACT

A leak detecting device for a fluid filled vessel including a housing, a clamp, a resilient member, and an opening. The housing has a continuous perimeter edge sized to extend around an underwater surface, the housing forming a hollow interior. The clamp secures to the housing. The resilient member secures to the perimeter edge of the housing and is adapted to contact and form a seal between the housing and the underwater surface. The opening is formed through an entirety of a wall of the housing, wherein the opening is accessible from an exterior of the housing.

8 Claims, 11 Drawing Sheets

Related U.S. Application Data

No. 15/279,590, filed on Sep. 29, 2016, now Pat. No. 10,088,383, which is a continuation-in-part of application No. 14/831,771, filed on Aug. 20, 2015, now Pat. No. 9,464,959, which is a continuation-in-part of application No. 13/838,618, filed on Mar. 15, 2013, now Pat. No. 9,128,002.

(51) Int. Cl.
*G01M 3/02* (2006.01)
*G01M 3/20* (2006.01)
*G01M 3/26* (2006.01)
*G01M 3/10* (2006.01)
*G01M 3/04* (2006.01)

(52) U.S. Cl.
CPC ............... *G01M 3/04* (2013.01); *G01M 3/10* (2013.01); *G01M 3/20* (2013.01); *G01M 3/26* (2013.01)

(58) Field of Classification Search
CPC ...... G01M 3/3254; G01M 3/20; G01M 3/002; G01M 3/02; G01M 3/2884; G01M 3/38; A01K 97/06
See application file for complete search history.

(56) References Cited

U.S. PATENT DOCUMENTS

| | | | | |
|---|---|---|---|---|
| 5,261,269 | A * | 11/1993 | Barker | G01M 3/226 222/174 |
| 5,381,990 | A * | 1/1995 | Belokin | F16B 47/00 248/205.9 |
| 5,711,501 | A * | 1/1998 | Belokin | F16B 2/185 248/205.5 |
| 5,734,096 | A * | 3/1998 | McGuigan | G01M 3/02 73/49.2 |
| 6,367,403 | B1 * | 4/2002 | Carter | A01K 97/06 114/343 |
| 6,463,791 | B1 * | 10/2002 | Berube | G01M 3/2884 73/46 |
| 2017/0284888 | A1 * | 10/2017 | Lenart | G01M 3/20 |

OTHER PUBLICATIONS

U.S. Pat. No. 10,088,383 filed Sep. 29, 2016.
U.S. Pat. No. 9,464,959 filed Aug. 20, 2015.
U.S. Pat. No. 9,128,002 filed Mar. 15, 2013.

\* cited by examiner

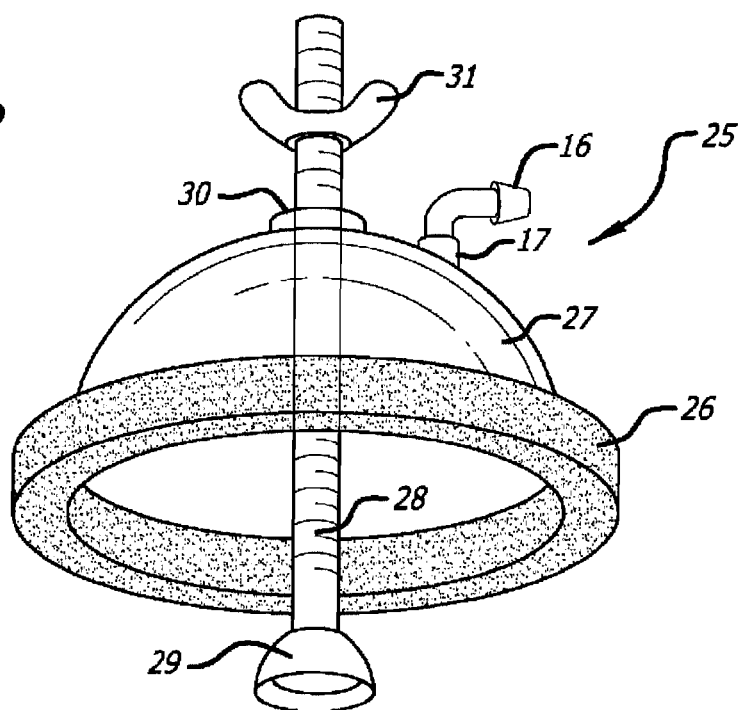

SYSTEM AND METHOD FOR DETECTING LEAKS IN A FLUID FILLED VESSEL

RELATED APPLICATIONS

This application is a continuation application and claims the benefit under 35 U.S.C. § 120 of U.S. patent application Ser. No. 16/114,279 filed on Aug. 28, 2018 and titled System and Method for Detecting Leaks in a Fluid Filled Vessel, which is a continuation of U.S. Pat. No. 10,088,383 filed on Sep. 29, 2016 and titled System and Method for Detecting Leaks in a Fluid Filled Vessel, which is a continuation-in-part of U.S. Pat. No. 9,464,959 filed on Aug. 20, 2015 and titled System and Method for Detecting Leaks in a Fluid Filled Vessel, which is a continuation of U.S. Pat. No. 9,128,002 filed on Mar. 15, 2013 and titled System and Method for Detecting Leaks in a Fluid Filled Vessel, the entire contents of which are incorporated herein by reference.

FIELD OF THE INVENTION

The present invention relates to systems and methods for leak detection, and, more particularly, to a system and method for detecting leaks in a liquid filled vessel such as a swimming pool.

BACKGROUND OF THE INVENTION

The use of leak detecting devices are well known in the art, particularly for use in swimming pools. Pools, whether above ground or underground, do leak. Leaks may occur around pool drains, pool lights, skimmers, suction and discharge lines and other pool surfaces, etc.

There is a need for a simple leak detection system for a swimming pool that is easy to use for a pool attendant or pool owner.

This background information is provided to reveal information believed by the applicant to be of possible relevance to the present invention. No admission is necessarily intended, nor should it be construed, that any of the preceding information constitutes prior art against the present invention.

SUMMARY OF THE INVENTION

With the above in mind, embodiments of the present invention are related to a leak detecting device for a fluid filled vessel including a housing, a clamp, a resilient member, and an opening. The housing may have a continuous perimeter edge sized to extend around an underwater surface, the housing forming a hollow interior. The clamp may secure to the housing. The resilient member may secure to the perimeter edge of the housing and be adapted to contact and form a seal between the housing and the underwater surface. The opening may be formed through an entirety of a wall of the housing, wherein the opening may be accessible from an exterior of the housing.

The housing may be made of a transparent material. The housing may be made of an opaque material.

The opening may be adapted to allow a user to view a flow of a dye through the opening for leak detection purposes.

The leak detecting device may also include a flow meter coupled to the opening to indicate a flow of fluid into or out of the interior of the housing. The flow meter may be transparent to allow a user to view a flow of a dye past the flow meter.

The leak detecting device may include a flexible pipe having a first end adapted to receive a dye and a second end in fluid communication with the opening.

The clamp may include an elongate portion and a protuberance. The elongated portion may have a plurality of spaced notches. The protuberance may be configured to be engaged by at least one of the spaced notches. The clamp may further include a trigger configured to disengage the protuberance from at least one of the spaced notches.

BRIEF DESCRIPTION OF THE DRAWINGS

FIG. 8 is an elevational view of the fluid detection device of FIG. 7.

FIG. 9 is a view similar to FIG. 8 showing the fluid detection device sealed to the pool light.

DETAILED DESCRIPTION OF THE INVENTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure. Like numbers refer to like elements throughout.

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the claimed invention.

In this detailed description of the present invention, a person skilled in the art should note that directional terms, such as "above," "below," "upper," "lower," and other like terms are used for the convenience of the reader in reference to the drawings. Also, a person skilled in the art should notice this description may contain other terminology to convey position, orientation, and direction without departing from the principles of the present invention.

Furthermore, in this detailed description, a person skilled in the art should note that quantitative qualifying terms such as "generally," "substantially," "mostly," and other terms are used, in general, to mean that the referred to object, characteristic, or quality constitutes a majority of the subject of the reference. The meaning of any of these terms is dependent upon the context within which it is used, and the meaning may be expressly modified.

Figure 1:
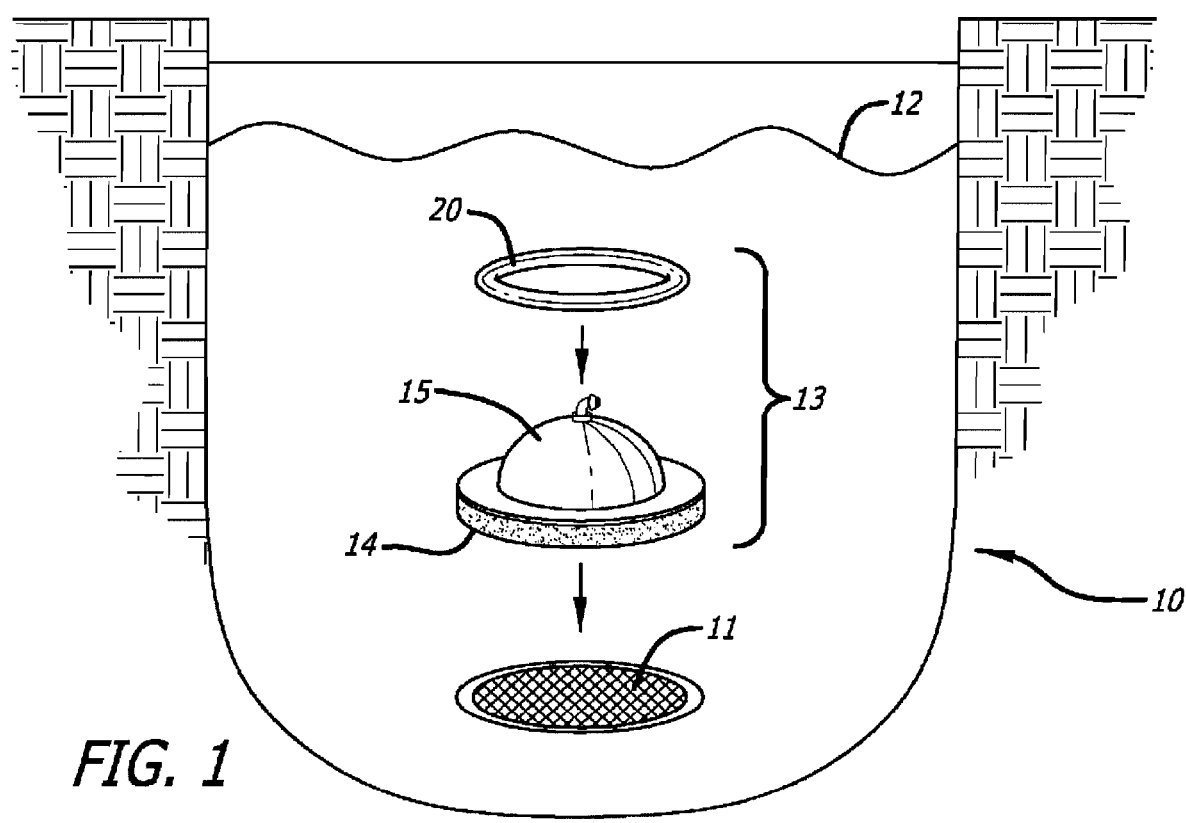
FIG. 1 is an elevational side view of a conventional swimming pool showing the leak detection device prior to installation against the main drain of the pool.

Referring now to the drawings, FIG. 1 is an elevational side view of a conventional swimming pool 10 showing the main drain 11 at the bottom of the pool below water level 12. A leak detection device 13 is shown in exploded view.

Figure 2:
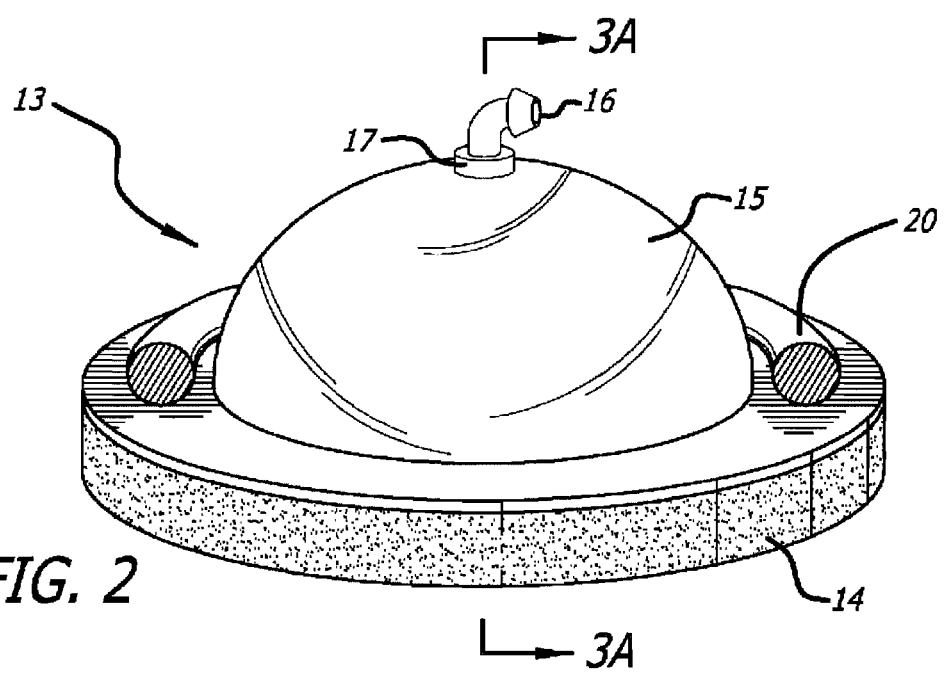
FIG. 2 is an elevational view of a portion of the leak detection device prior to installation.
Figure 3:
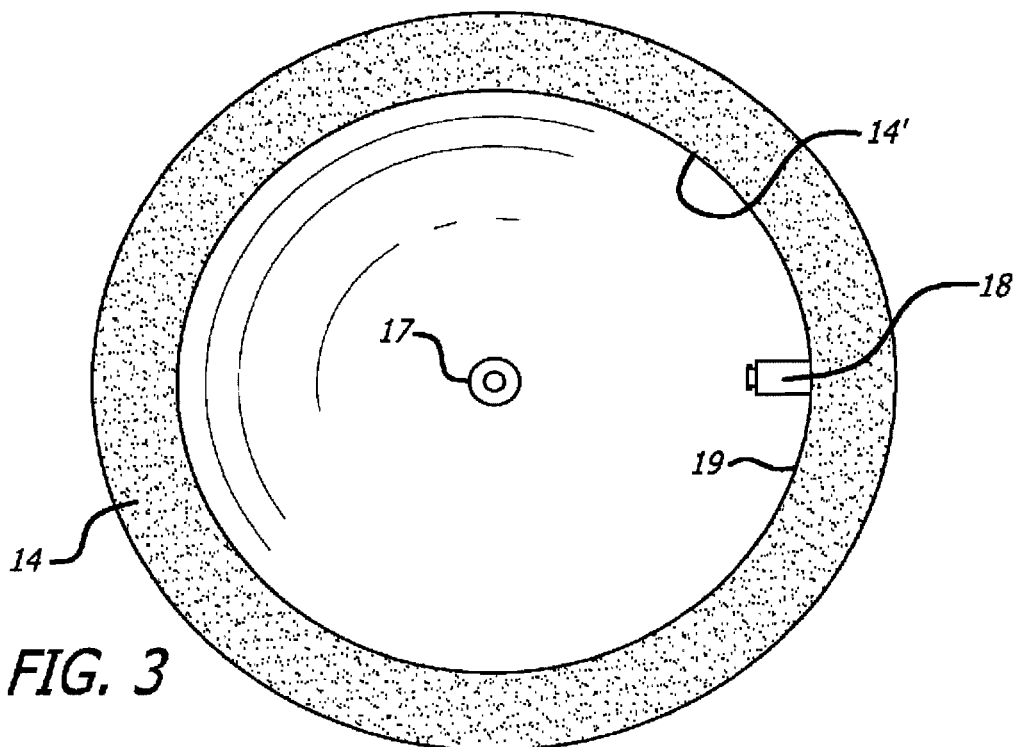
FIG. 3 is a bottom view of a component of the leak detection device of FIG. 2 taken along lines 3-3 of FIG. 2.
Figure 3A:
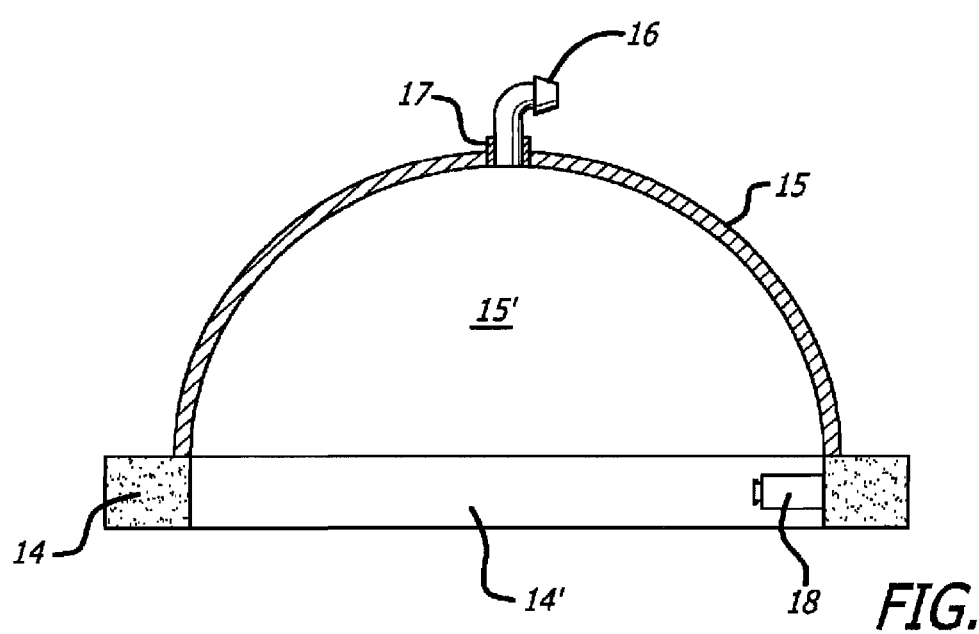
FIG. 3A is a cross-sectional view taken along line 3A-3A of FIG. 2.

As seen in FIG. 2, the leak detection device 13 includes a resilient member 14 which is preferably of rubber, such as a soft synthetic rubber, or any other suitable material. It may be solid or inflatable, and preferably annular, such as circular, circular in outer configuration and of a diameter greater than the diameter of drain 11, which drains are generally circular. Thus, as seen in FIG. 3, member 14 has a central hole or opening 14' communicating with the hollow interior 15' of member 15 (see FIG. 3A). The resilient member 14 can be circular, square or rectangular. Most current drains are rectangular and most commercial drains are square.

Housing 15 thus is secured to member 14 and may be of a solid material, such as plastic, preferably transparent and dome-shaped. However, the housing may be opaque with provisions to determine the flow of dye. For instance a fluid inlet barb 16 may be provided at top of housing 15 communicating with the interior 15' of housing 15 for injecting fluid into the interior 15' of housing 15. The fluid inlet barb 16 may be transparent if the housing is opaque wherein fluid flow can be visually observed. A washer 17, such as a neoprene washer, may be provided where barb 16 enters housing 15 to provide a liquid-tight seal.

As seen in FIG. 3, if member 14 is an inflatable tube, a conventional air inlet 18 may be provided on the bottom wall 19 for inflating tube 14 with air from a suitable exterior source.

Figure 4:
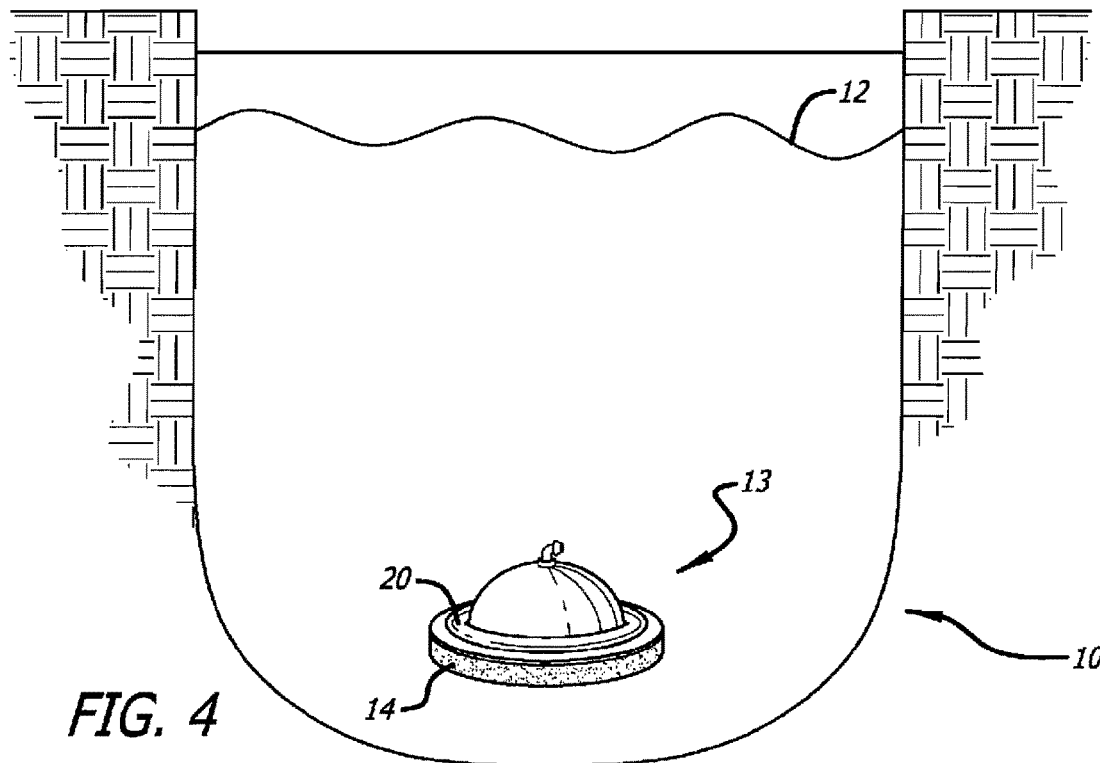
FIG. 4 is a view similar to FIG. 1 showing the leak detection device in position against the pool drainage.

As seen in FIG. 1, a weighted member 20 may be provided to hold housing 15 and member 14 downwardly in a sealing position against drain 11 as seen in FIG. 4. Member 20 is generally a circular ring adapted to encircle housing 15, as seen in FIG. 4, and may be of sufficient weight, such as 10 pounds, to hold device 13 in position against drain 11 creating a seal. Any suitable materials may be used, such as a plastic coated material.

In operation, when the leak detection device 13 is installed against the drain 11 of the pool of FIG. 1, a conventional flow meter may be connected to barb 16 to detect any leaks therethrough. Alternatively, by connecting a suitable hose to barb 16 and running it to the surface of the pool or the like, components in the pool or the like may be tested for leaks while the operator is above water. Thus, any suitable dye solution such as ordinary food coloring and water may be injected therein. If there is a leak, the dye solution will be sucked into the barb 16 that is functioning as an inlet for housing 23. If the pool component is not leaking, the dye will not be sucked in but instead maintain a natural swaying motion underwater.

Alternatively, the pool owner or operator of pool maintenance may dive underwater with a dye solution and inject it through barb inlet 16 using a syringe or the like.

Figure 5:
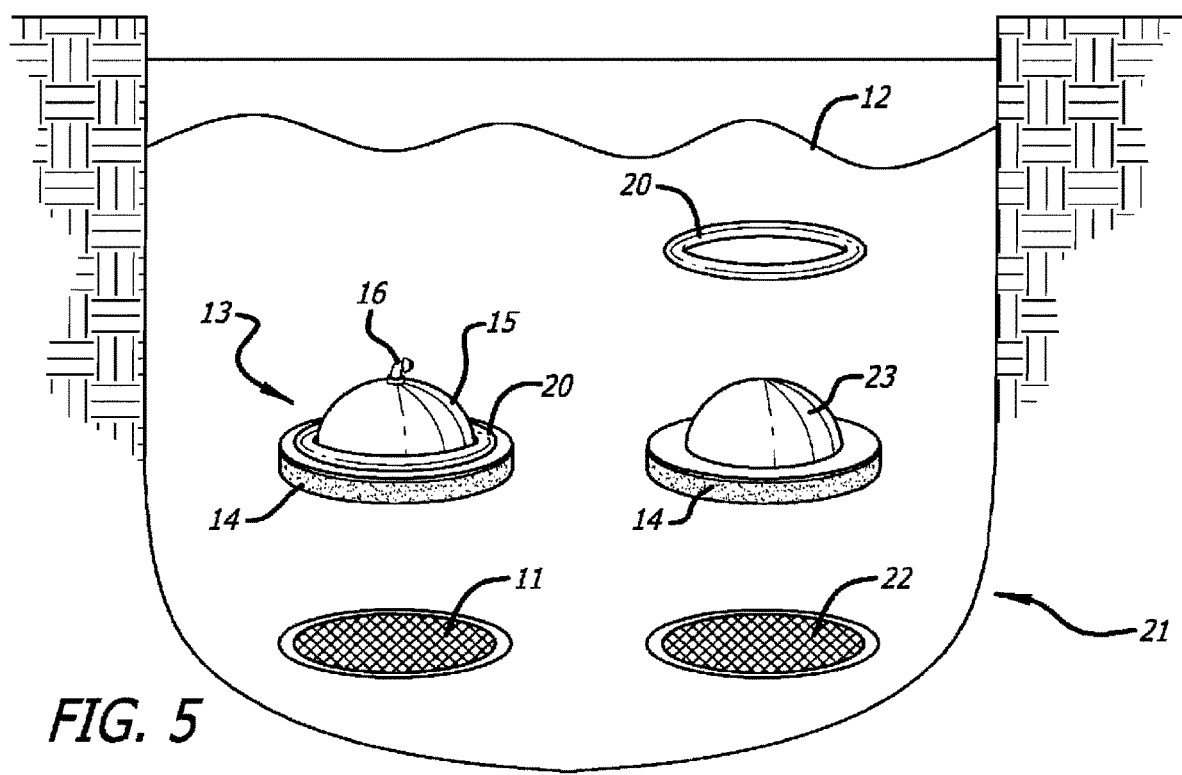
FIG. 5 is an elevational side view of a conventional pool having 2 drains therein with the leak detection device installed over one drain and a second similar device installed over the second drain.
Figure 6:
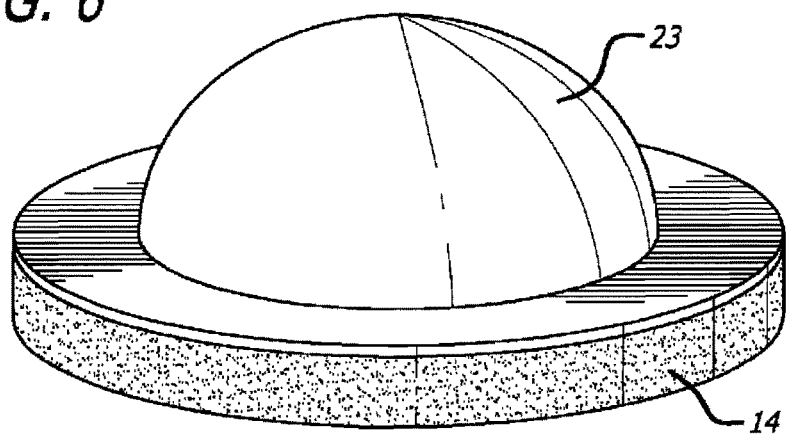
FIG. 6 is an elevational view of a modified portion of the leak detection device of FIG. 2.

As seen in FIG. 5, wherein like numerals refer to like parts of FIG. 1, pool 21 has 2 drains, 11 and 22. Here, housing 23, otherwise similar to housing 15, does not have a barb inlet 16 as seen in FIG. 6. Housing 15 and member 14, weighted by ring member 20, is held against drain 22 while drain 11 is tested for leaks as heretofore discussed, since such drains are generally connected as part of the drain system.

Figure 7:
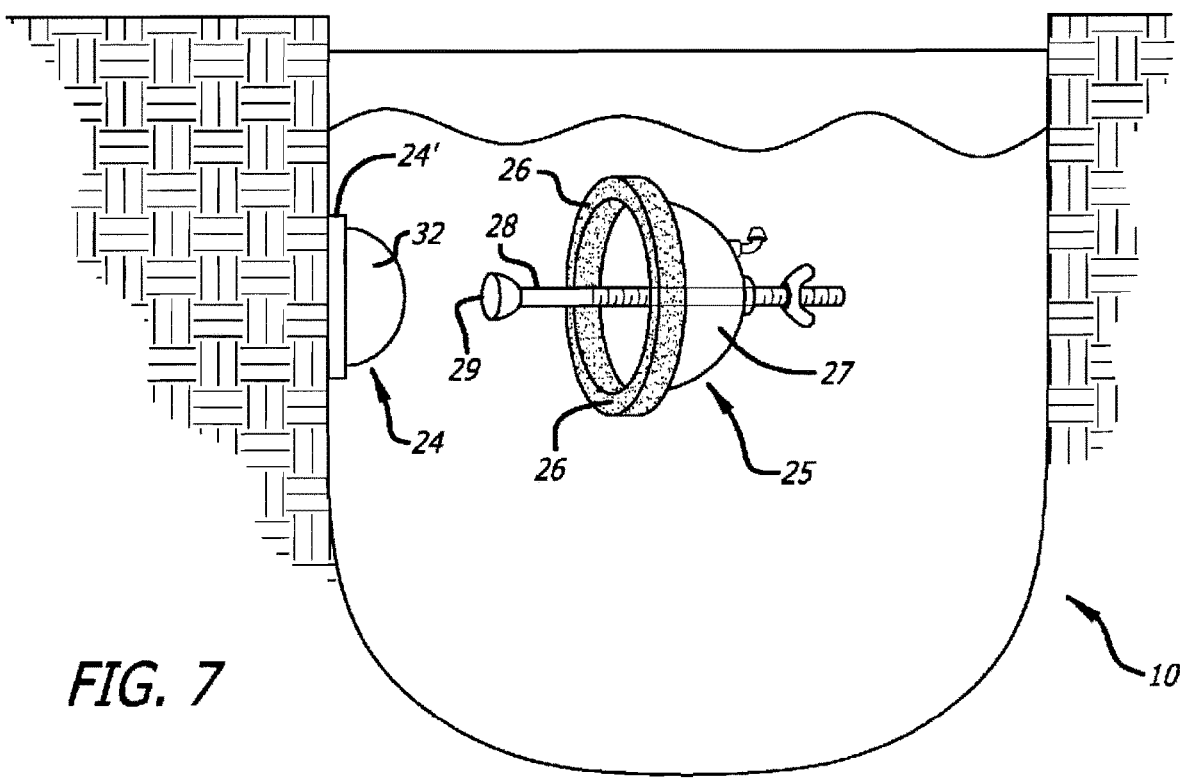
FIG. 7 is a side elevational view of the pool of FIG. 1 showing a conventional pool light installed in the sidewall of the pool and a modified fluid detection device prior to installation.

As seen in FIG. 7, wherein like numerals refer to like parts of FIG. 1, a conventional pool light 24 is shown mounted in the sidewall of pool 10. Here, weighted member 20 is not necessary.

The fluid detection device 25 of FIG. 7 is shown having a resilient member 26, which may be similar to member 14, and may also be inflatable, a housing 27 which may be similar to housing 15, and a barb inlet 16 and washer 17 similar to that shown in the embodiment of FIGS. 1 and 2. However, in this embodiment, a threaded shaft 28 extends through housing 27 and the center of ring 26 and terminates in a conventional suction cup 29 of a resilient material, such as rubber. A resilient washer 30 is provided where shaft 28 enters housing 27, and a wing nut 31, which may be of plastic, may be provided threaded on shaft 28.

As seen in FIG. 7, shaft 28 extends into a position where cup 29 may engage the outside of dome 32 of light 24. Member 26 is again preferably circular and of a diameter to cover light 24 abutting against the frame 24' holding dome 32 in position (see FIG. 9). Suction cup 29 abuts against dome 32 and wing nut 31 is tightened to force a seal of detection device 25 to light 24 that is created when tightened. The seals actually seal against the surface of the pool. Barb inlet 16 may be used to inject a dye all as previously discussed. While the member is preferably circular, the member can also be square or rectangular. Most current drains are rectangular and most commercial drains are square.

Figure 10:
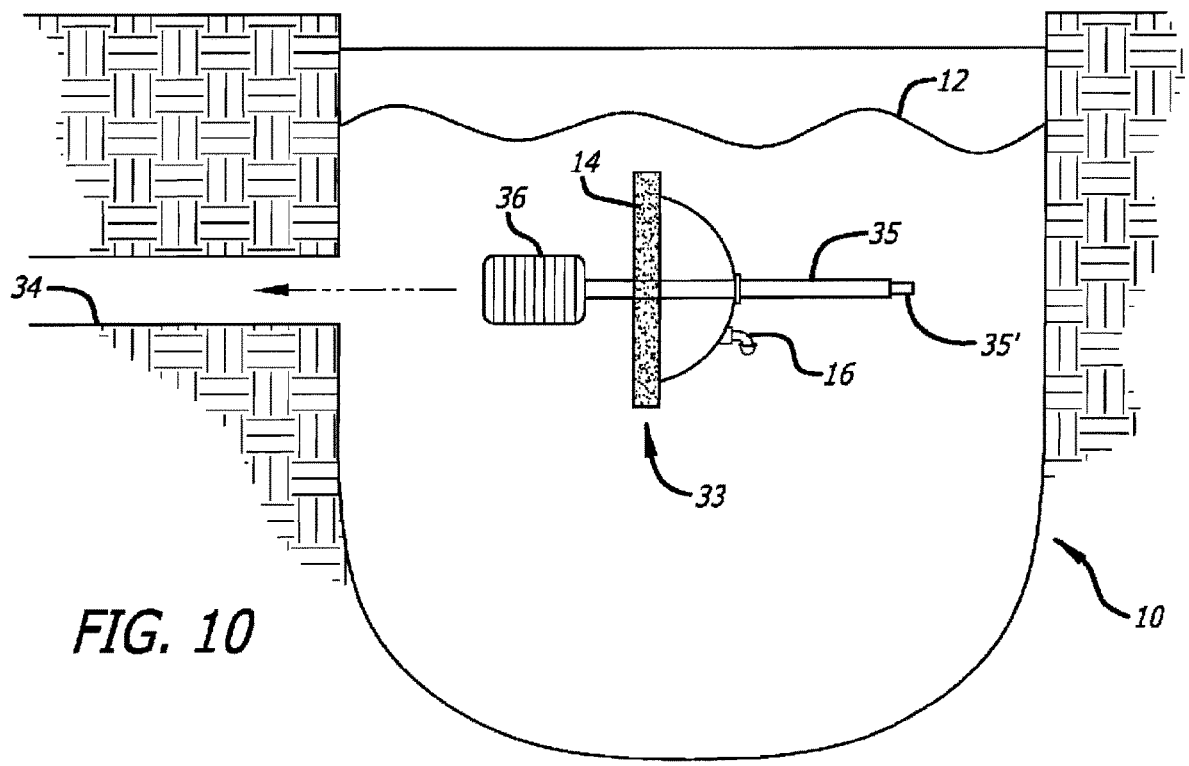
FIG. 10 is a view similar to FIG. 1 showing still another fluid detection device prior to mounting to a suction or discharge pipe of the pool.
Figure 11:
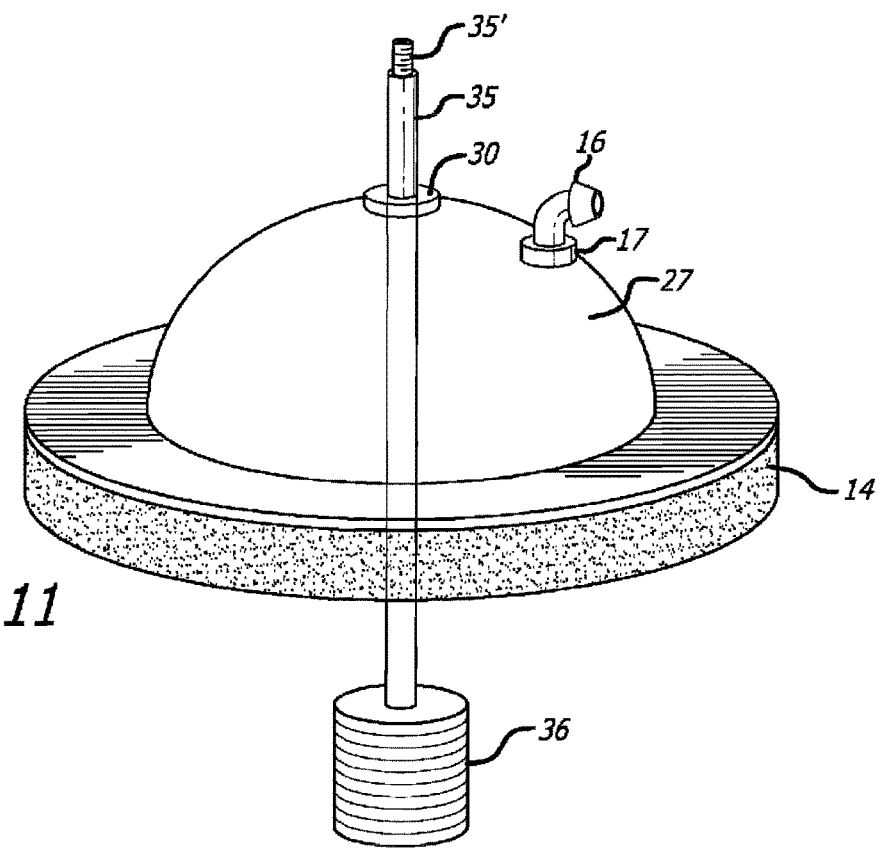
FIG. 11 is an elevational view of the fluid detection device of FIG. 10.
Figure 12:
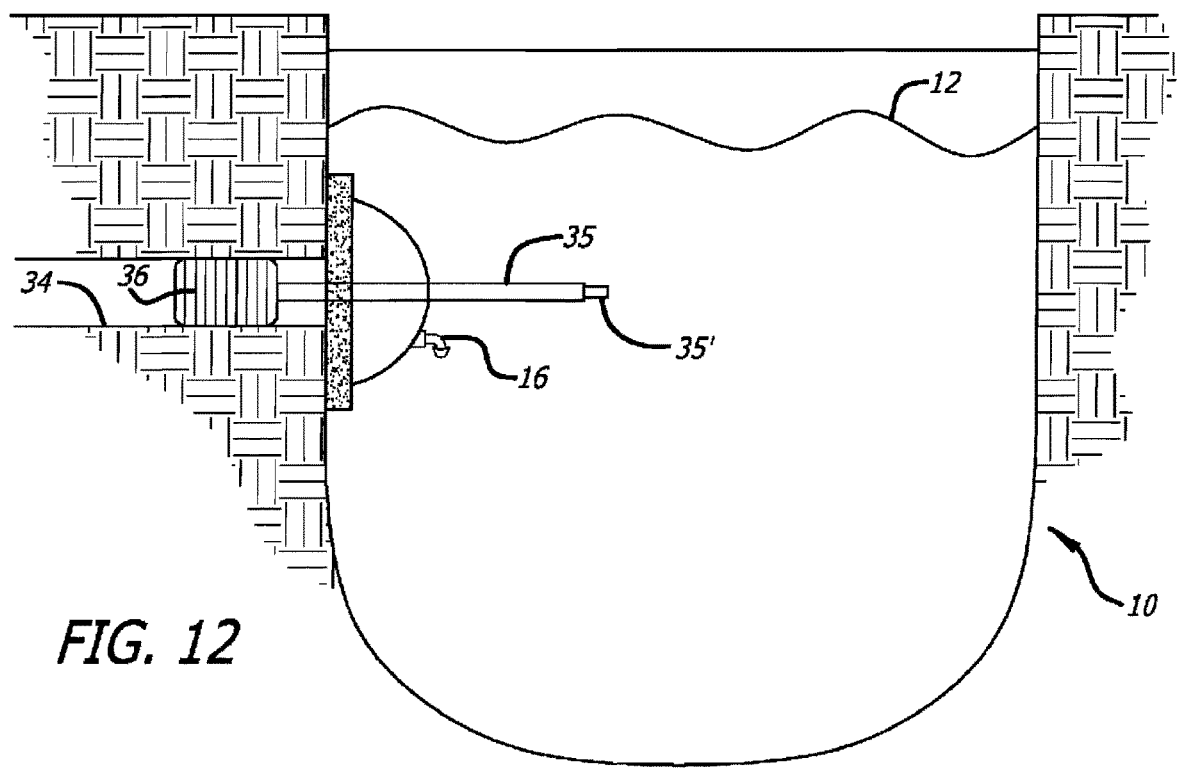
FIG. 12 is a view similar to FIG. 10 illustrating operations of the fluid detection device of FIG. 11.

FIG. 10 shows still another embodiment of the invention. Here, fluid detection device 33, otherwise similar to the fluid detection device components 14, 15 of FIG. 1, shows a conventional suction/discharge pipe 34 of pool 10. As seen in FIG. 11, again member 14 is a resilient member that may be a solid ring or an inflatable ring, and housing 27 is similar to housing 27 of FIG. 8 also having a barbed inlet 16 and washers 17, 30. However, in this embodiment, a hose 35 extends through housing 27, through the center of member 14, and terminates at bottom in an inflatable plug 36. As seen in FIG. 12, plug 36 is inserted into pipe 34 and air may be injected into tube 35 by connecting a suitable source of air to threaded fitting 35' at the top of inflating plug 36 which expands, outwardly against the interior wall of pipe 34, as seen in FIG. 12, to seal off the pipe 34. Again, the leak detection operations discussed above can be carried out through inlet 16.

Figure 13:
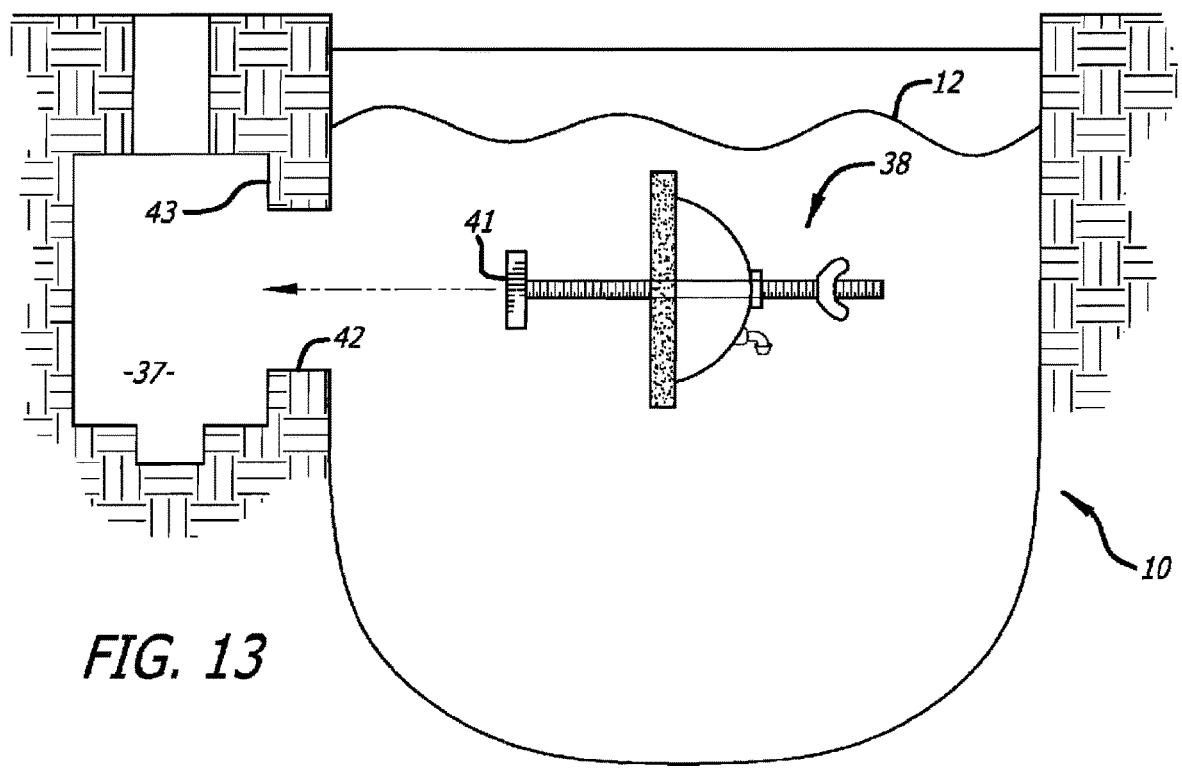
FIG. 13 is a side elevational view of the pool of FIG. 1 showing a conventional skimmer mounted in the side wall and a fluid detection device similar to those discussed in FIGS. 1 to 12.
Figure 14:
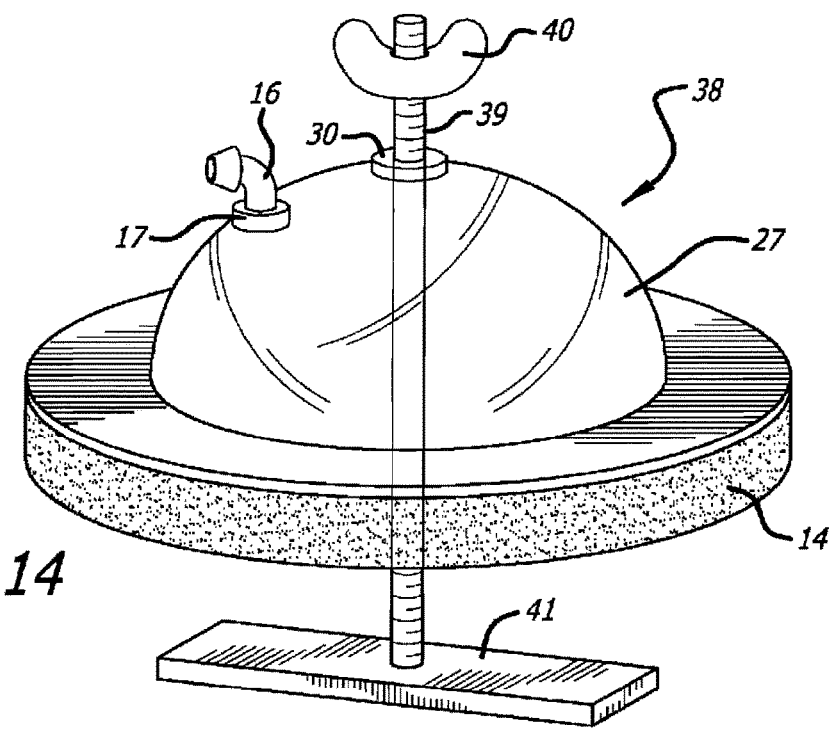
FIG. 14 is an elevational view of the fluid detection device alone of FIG. 13.

FIG. 13 shows a skimmer 37 mounted in the side wall of pool 10 and a fluid detection device 38 shown in detail in FIG. 14. Here, member 14 and housing 27 may be identical to the member 14 and housing 27 of FIG. 8. However, threaded shaft 39, having wing nut 40 threaded thereon, terminates in a brace 41, which may be elongated and generally rectangular, and of any suitable material, such as plastic.

Figure 15:
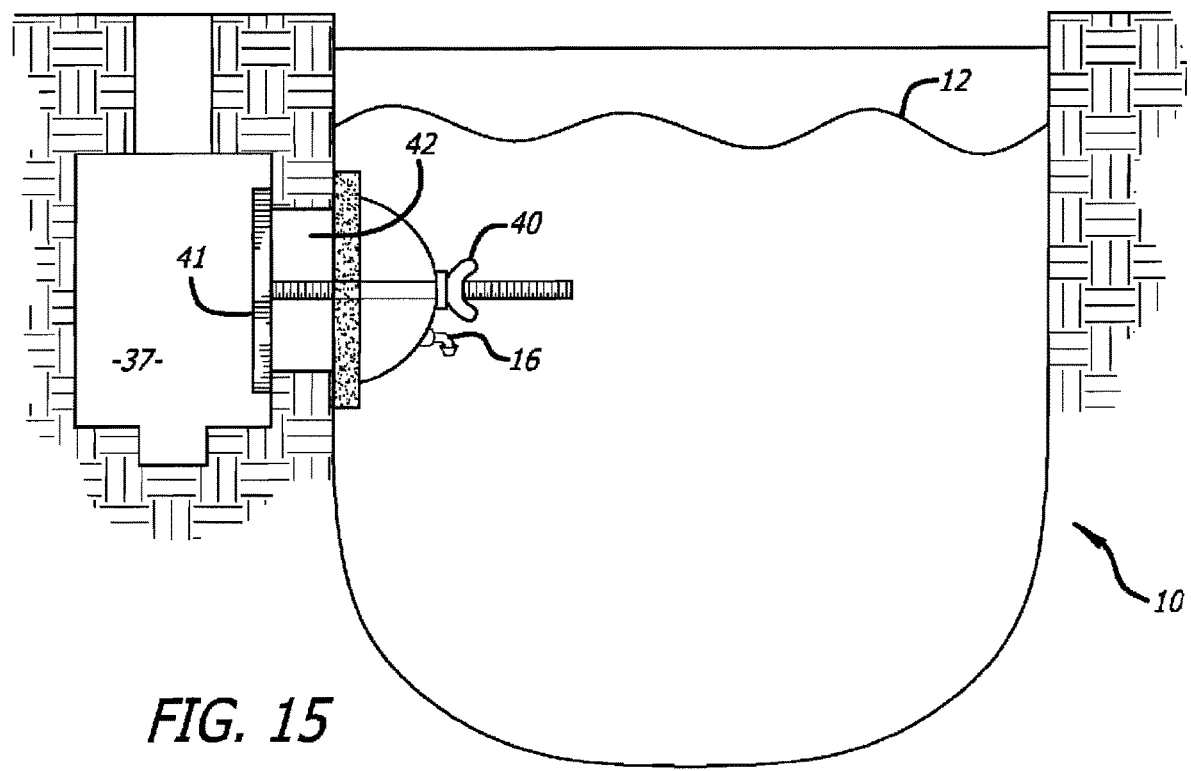
FIG. 15 is a view similar to FIG. 13 showing the fluid detection device in position engaging the pool skimmer.

As seen in FIG. 15, brace 41 is inserted into the opening 42 of skimmer 37, being tilted to facilitate entry, then nut 40 is tightened to seal brace 41 against the inner wall 43 surrounding opening 42 of skimmer 37 sealing off the same as previously, discussed.

Again, inlet 16 may be used to carry out the aftermentioned leak detection.

Figure 16:
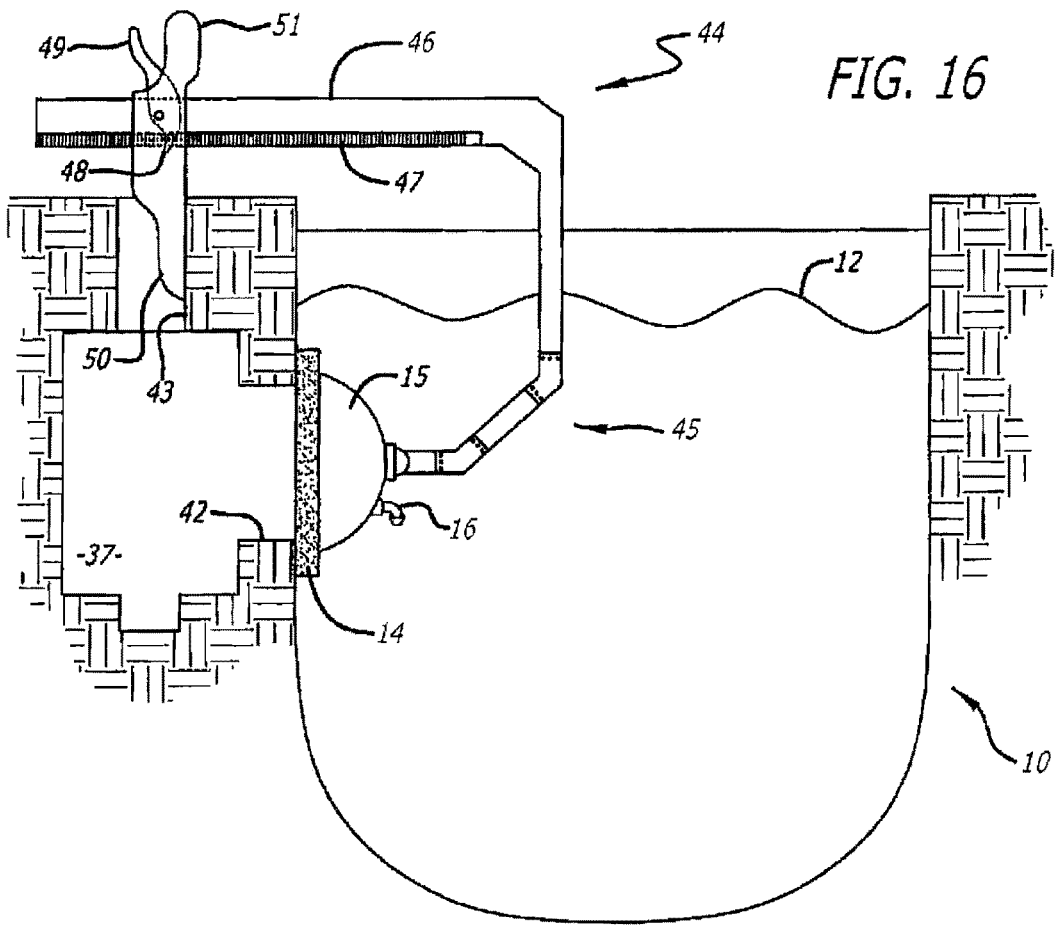
FIG. 16 is a side elevational view of the pool of FIG. 1 similar to FIG. 13 but showing a modified leak detection device in installed position.
Figure 17:
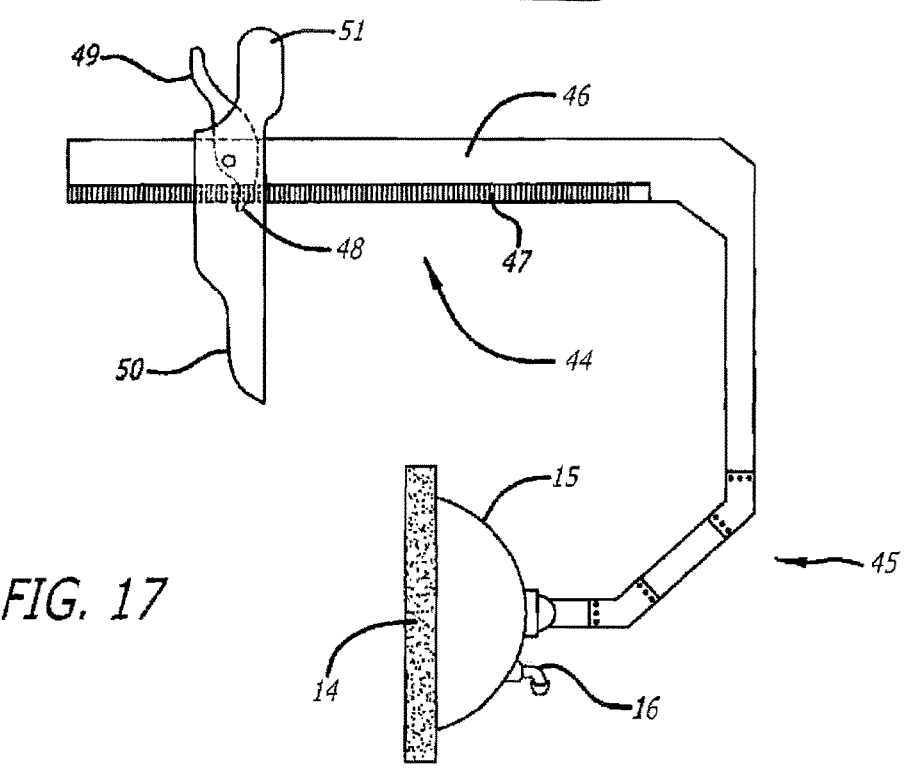
FIG. 17 is an elevational view of the fluid detection device alone of FIG. 16.

Still another modification is shown in FIG. 16. The fluid detection device 44 includes a housing 15 and resilient member 14 and inlet 16 similar to that of the embodiment of FIG. 1. However, in this embodiment, an adjustable clamp 45 is coupled to housing 15 and has an 11 elongated portion 46 with a plurality of spaced slots or notches 47 engaged by a tooth 48 of a trigger 49 mounted in a clamp portion 50 extending downwardly from extension portion 46. By grasping handle 51 and squeezing trigger 49, into and out of engagement with notches 47, clamp portion 50 can be ratcheted closed along elongated portion 46 similar to a conventional jar lid opener. Thus, as seen in FIG. 17, clamp portion 50 is extending down into the interior of skimmer 37, the skimmer lid having been removed, abutting against inner wall 43, and sealing resilient member 14 and housing 15 against the opening 42 leading into skimmer 37 when trigger 49 is squeezed and clamp portion 50 latches closed.

It can be seen that there are described various embodiments of the invention. Variations thereof may occur to an artisan and the scope of the invention should only be limited by the scope of the appended claims. Any suitable materials or dimensions may be used to carry out the teachings of the invention. Member 14 need only be of a sufficient size to completely surround and seal against the pool component being tested for leaks.

Figure 18:
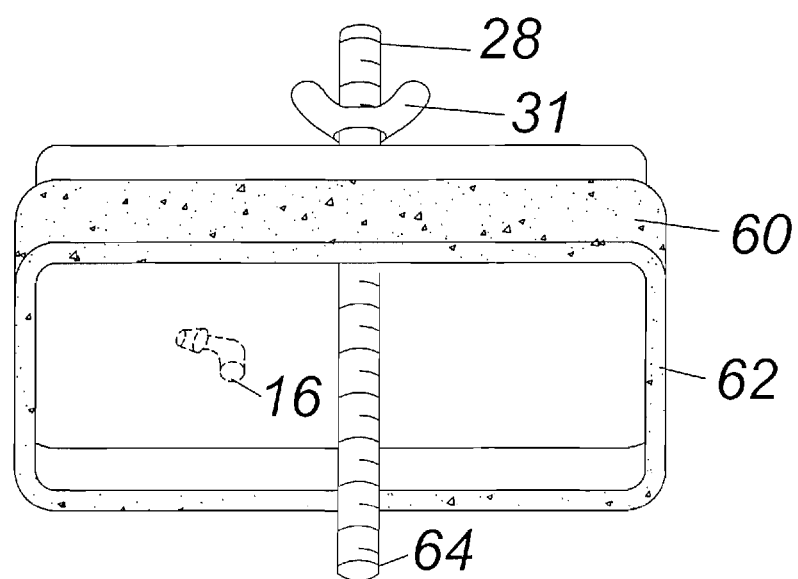
FIG. 18 is an elevational view of a rectangular shaped fluid detection device.
Figure 19:
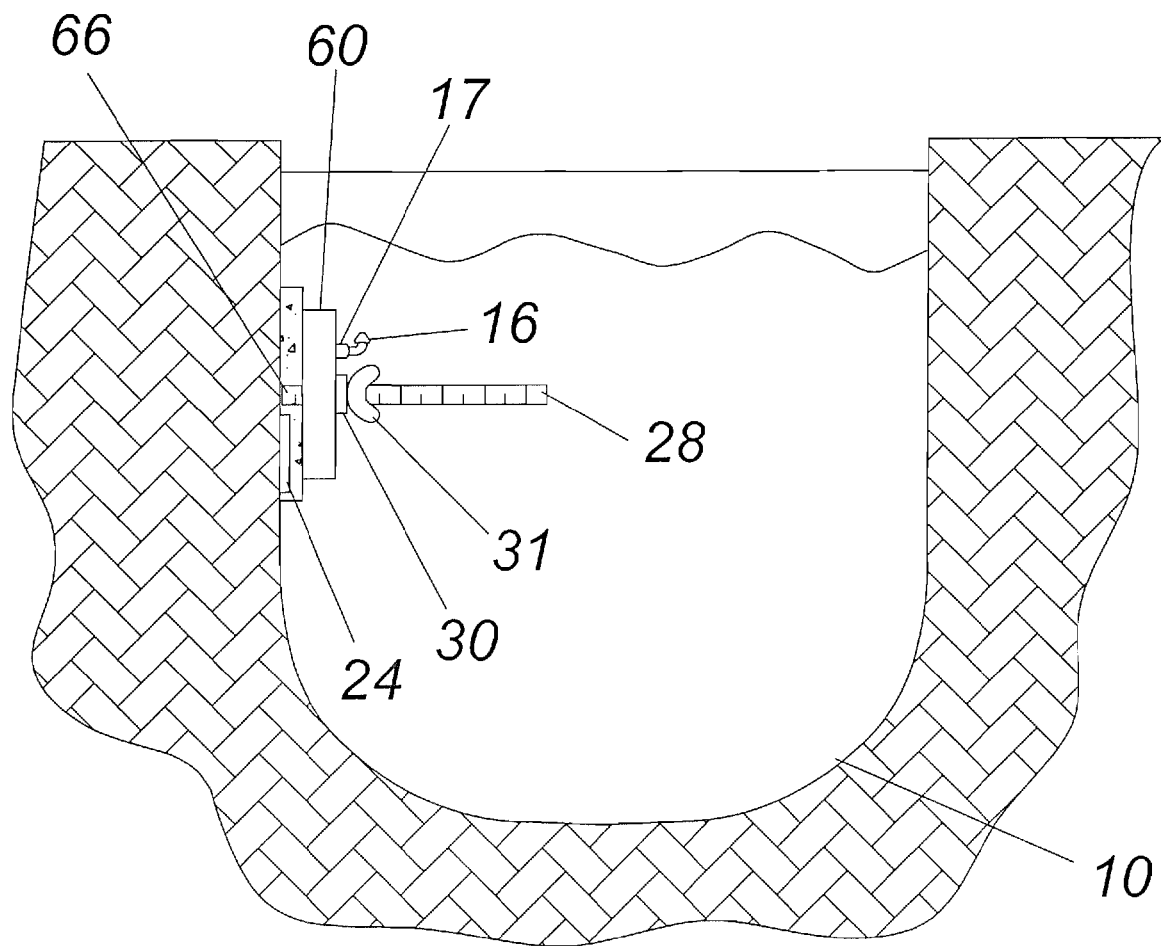
FIG. 19 is a side elevational view of the pool showing a conventional pool light installed in the sidewall of the pool and a modified fluid detection device of FIG. 1 threaded into a swimming pool light threaded socket.

As depicted in FIG. 19, wherein like numerals refer to like parts of FIG. 1, a conventional pool light 24 is shown mounted in the sidewall of pool 10. The fluid detection device 60 of FIGS. 18 and 19 is shown having a resilient member 62 secured to a substantially square or rectangle shaped housing 60 which operates similar to housing 15 and includes a barb inlet 16 and washer 17 similar to that shown in the embodiment of FIGS. 1 and 2. However, in this embodiment, a threaded shaft 28 extends through housing 60 and terminates with threads 64 that are constructed and arranged to match a threaded receptacle 66 of the swimming pool light 24. For instance, most all pool lights are secured to a base by use of a threaded screw. The threaded screw can be removed and the threaded shaft 28 used to directly engage the pool light support. A resilient washer 30 is provided where shaft 28 enters the housing 60, and a wing nut 31, which may be of plastic, may be provided threaded on shaft 28.

In this embodiment, the housing 60 is rectangular and the housing offset so that the shaft 28 enters the housing 60 closer to one edge. The amount of pressure applied during the leak detection is negligible wherein the seal 62 is capable of securing the housing 60 to form a sealed interior space. As with the previous embodiments, the housing is preferably transparent but may also be made opaque. In yet another embodiment, the housing may have a transparent sections or a sight glass to assist in visual detection of flow or dye movement.

Some of the illustrative aspects of the present invention may be advantageous in solving the problems herein described and other problems not discussed which are discoverable by a skilled artisan.

While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

Thus the scope of the invention should be determined by the appended claims and their legal equivalents, and not by the examples given.

The claims in the instant application are different than those of the parent application or other related applications. Applicant therefore rescinds any disclaimer of claim scope made in the parent application or any predecessor application in relation to the instant application. Any such previous disclaimer and the cited references that it was made to avoid, may need to be revisited. Further, any disclaimer made in the instant application should not be read into or against the parent application.

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the claimed invention.

In this detailed description of the present invention, a person skilled in the art should note that directional terms, such as "above," "below," "upper," "lower," and other like terms are used for the convenience of the reader in reference to the drawings. Also, a person skilled in the art should notice this description may contain other terminology to convey position, orientation, and direction without departing from the principles of the present invention.

Furthermore, in this detailed description, a person skilled in the art should note that quantitative qualifying terms such as "generally," "substantially," "mostly," and other terms are used, in general, to mean that the referred to object, characteristic, or quality constitutes a majority of the subject of the reference. The meaning of any of these terms is dependent upon the context within which it is used, and the meaning may be expressly modified.

An embodiment of the invention, as shown and described by the various figures and accompanying text, provides a Some of the illustrative aspects of the present invention may be advantageous in solving the problems herein described and other problems not discussed which are discoverable by a skilled artisan.

While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

Thus the scope of the invention should be determined by the appended claims and their legal equivalents, and not by the examples given.

The claims in the instant application are different than those of the parent application or other related applications. Applicant therefore rescinds any disclaimer of claim scope made in the parent application or any predecessor application in relation to the instant application. Any such previous disclaimer and the cited references that it was made to avoid, may need to be revisited. Further, any disclaimer made in the instant application should not be read into or against the parent application.

The invention claimed is:

1. A leak detecting device for a fluid filled vessel comprising:
    a housing having a continuous perimeter edge sized to extend around an underwater surface, the housing forming a hollow interior;
    a clamp secured to the housing, wherein the clamp comprises:
        a rigid elongated portion fixedly secured to the housing, and
        a clamp portion secured to the elongated portion and adjustable to increase or decrease a distance between an engaging surface of the clamp portion and the underwater surface;
    a resilient member secured to the perimeter edge of the housing and adapted to contact and form a seal between the housing and the underwater surface; and
    an opening through an entirety of a wall of the housing, wherein the opening is accessible from an exterior of the housing.

2. The leak detecting device according to claim 1 wherein the housing is made of a transparent material.

3. The leak detecting device according to claim 1 wherein the housing is made of an opaque material.

4. The leak detecting device according to claim 1 wherein the opening is adapted to allow a user to view a flow of a dye through the opening for leak detection purposes.

5. The leak detecting device according to claim 1 further comprising a flexible pipe having a first end adapted to receive a dye and a second end in fluid communication with the opening.

6. The leak detecting device according to claim 1 wherein the clamp further comprises:
    a trigger configured to move the clamp portion relative to the elongated portion.

7. The leak detecting device according to claim 1 further comprising:
    a flow meter coupled to the opening to indicate a flow of fluid into or out of the interior of the housing.

8. The leak detecting device according to claim 7 wherein the flow meter is transparent to allow a user to view a flow of a dye past the flow meter.

* * * * *